US011263595B2

(12) United States Patent
Tibrewala et al.

(10) Patent No.: US 11,263,595 B2
(45) Date of Patent: Mar. 1, 2022

(54) ELECTRONIC SCHEDULING ASSISTANT UTILIZING CATEGORIES OF PARTICIPANTS

(71) Applicant: Microsoft Technology Licensing, LLC, Redmond, WA (US)

(72) Inventors: Kanika Atul Tibrewala, Mumbai (IN); Suvojyoti Ray, Kolkata (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 97 days.

(21) Appl. No.: 16/505,924

(22) Filed: Jul. 9, 2019

(65) Prior Publication Data

US 2021/0012294 A1 Jan. 14, 2021

(51) Int. Cl.
*G06Q 10/00* (2012.01)
*G06F 3/00* (2006.01)
*G06Q 10/10* (2012.01)
*G06F 3/0482* (2013.01)
*G06F 3/0486* (2013.01)

(52) U.S. Cl.
CPC ....... *G06Q 10/1095* (2013.01); *G06F 3/0482* (2013.01); *G06F 3/0486* (2013.01); *G06Q 10/1093* (2013.01)

(58) Field of Classification Search
None
See application file for complete search history.

(56) References Cited

U.S. PATENT DOCUMENTS

| 7,797,642 B1 | 9/2010 | Karam et al. |
| 10,572,858 B2 * | 2/2020 | Nelson ................ G06Q 10/109 |
| 2005/0102245 A1 | 5/2005 | Edlund et al. |
| 2006/0293943 A1 * | 12/2006 | Tischhauser ..... G06Q 10/06314 |
| | | 705/7.24 |
| 2007/0005409 A1 | 1/2007 | Boss et al. |

(Continued)

OTHER PUBLICATIONS

"Calendar Application Interface", Retrieved from: https://xf-wiki.mithi.com/index.php/Baya_User_Guide:_Accessing_Calendars/3.20, Retrieved Date: Apr. 25, 2019, 96 Pages.

(Continued)

*Primary Examiner* — Hafiz A Kassim
*Assistant Examiner* — Matheus Ribeiro Stivaletti
(74) *Attorney, Agent, or Firm* — Michael Best & Friedrich LLP

(57) ABSTRACT

Methods and systems for providing electronic scheduling assistance. One system includes an electronic computing device including an electronic processor. The electronic processor is configured to retrieve a category assigned from a plurality of categories to each of a plurality of participants associated with a calendar event and retrieve a schedule associated with each of the plurality of participants associated with the calendar event. The electronic processor is also configured to aggregate the schedules of each of the plurality of participants assigned to each of the plurality of categories to create an aggregated schedule associated with each of the plurality of categories and generate and output a user interface for display on a display device, the user interface including the aggregated schedule of each of the plurality of categories in separate regions of the user interface.

17 Claims, 6 Drawing Sheets

(56) References Cited

U.S. PATENT DOCUMENTS

| | | | |
|---|---|---|---|
| 2008/0141142 A1* | 6/2008 | Lyle | G06Q 10/109 715/751 |
| 2008/0294482 A1* | 11/2008 | Bank | G06Q 10/06311 705/7.13 |
| 2010/0015586 A1* | 1/2010 | Park | G06Q 10/10 434/247 |
| 2011/0173221 A1 | 7/2011 | Ahiakpor et al. | |
| 2012/0210251 A1* | 8/2012 | Abrams | G06Q 10/06 715/753 |
| 2012/0304088 A1* | 11/2012 | Kho | G06Q 10/109 715/764 |
| 2013/0218622 A1* | 8/2013 | MacKenzie | G06Q 10/1093 705/7.19 |
| 2013/0290188 A1* | 10/2013 | Olliphant | G06Q 20/405 705/44 |
| 2014/0026088 A1* | 1/2014 | Monte | G06F 3/04855 715/765 |
| 2014/0075284 A1* | 3/2014 | Logtenberg | G06Q 10/109 715/234 |
| 2014/0115464 A1* | 4/2014 | Shih | G06Q 10/109 715/716 |
| 2014/0172483 A1* | 6/2014 | Bellers | G06Q 50/14 705/7.16 |
| 2017/0199855 A1* | 7/2017 | Fishbeck | G06T 11/60 |
| 2017/0279747 A1* | 9/2017 | Melzer | G06Q 10/107 |
| 2018/0025325 A1* | 1/2018 | Bosko | G06Q 10/1095 705/5 |
| 2018/0077542 A1* | 3/2018 | Xie | H04W 4/12 |
| 2018/0165652 A1 | 6/2018 | Bastide et al. | |
| 2019/0074987 A1* | 3/2019 | Wiener | G06Q 10/10 |
| 2020/0036544 A1* | 1/2020 | Suhail | H04L 12/1827 |
| 2020/0052921 A1* | 2/2020 | van Rensburg | H04L 51/04 |
| 2020/0272954 A1* | 8/2020 | Serra | G06Q 10/0631 |
| 2020/0273477 A1* | 8/2020 | Kwatra | G10L 21/0208 |

OTHER PUBLICATIONS

"Using the Outlook Scheduling Assistant", Retrieved from: https://www.canr.msu.edu/news/using-the-outlook-scheduling-assistant, Apr. 27, 2017, 4 Pages.

"What can you do with Calendar?", Retrieved from: https://web.archive.org/web/20180529225004/https:/gsuite.google.com/learning-center/products/calendar/get-started/#!/, May 29, 2018, 14 Pages.

Poremsky, Diane, "To Cc or Bcc a Meeting Request", Retrieved from: https://web.archive.org/web/20180329125631/http:/www.slipstick.com/outlook/calendar/to-cc-or-bcc-a-meeting-request/, Mar. 29, 2018, 12 Pages.

Ruth, Amgela, "Entrepreneurs Need a Better Calendar App Than the 2 Everybody Uses", Retrieved from: https://www.entrepreneur.com/article/323672, Nov. 25, 2018, 29 Pages.

"International Search Report and Written Opinion Issued in PCT Application No. PCT/US20/033892", dated Jun. 29, 2020, 11 Pages.

* cited by examiner

ELECTRONIC SCHEDULING ASSISTANT UTILIZING CATEGORIES OF PARTICIPANTS

FIELD

Embodiments described herein relate to electronic scheduling assistants, and, in particular methods and systems for displaying different categories of participants for a calendar event, such as a meeting, separately within a scheduling assistant.

SUMMARY

Some electronic calendar applications present one or more user interfaces, often called an electronic scheduling assistant, that aid a user in scheduling a calendar event, such as meeting. For example, when a user (an organizer) creates a meeting and selects a plurality of participants to invite to the meeting, an electronic scheduling assistant may aggregate the schedules of each of the plurality of participants and display the aggregated schedule to the organizer so that the organizer can select a time for the meeting that works for each participant invited the meeting. However, in situations where the meeting attendance of one or more participants is optional, displaying the aggregated schedule for each participant within the electronic scheduling assistant makes it difficult for the organizer to determine if there is a time where each participant who is required to attend the meeting is available regardless of whether other participants, who attendance is optional, are available.

Therefore, embodiments described herein provide an electronic scheduling assistant within an electronic calendaring application that generates, for each of a plurality of categories of participants, an aggregated schedule for the category that identifies the schedules of participants included in the category. Thus, using the separate aggregated schedules, an organizer can easily determine when, for example, all participants associated with one category (for example, a "required category") are available for an event (regardless of the availability of participants in other categories). Dividing participants into a plurality of categories and generating an aggregated schedule for each of the categories allows organizers to more quickly and easily schedule events. Also, in some embodiments, the electronic scheduling assistant described herein collapses an aggregated schedule for a particular category to provide a single schedule entry, which further simplifies the user interfaces provided via the electronic scheduling assistant and improve user efficiency and resource usage.

In particular, one embodiment provides a system for providing electronic scheduling assistance. The system includes an electronic computing device including an electronic processor. The electronic processor is configured to retrieve a category assigned from a plurality of categories to each of a plurality of participants associated with a calendar event and retrieve a schedule associated with each of the plurality of participants associated with the calendar event. The electronic processor is also configured to aggregate the schedules of each of the plurality of participants assigned to each of the plurality of categories to create an aggregated schedule associated with each of the plurality of categories, and generate and output a user interface for display on a display device, the user interface including the aggregated schedule of each of the plurality of categories in separate regions of the user interface.

Another embodiment provides a method for providing electronic scheduling assistance. The method includes retrieving, with an electronic processor, a category assigned from a plurality of categories to each of a plurality of participants associated with a calendar event and retrieving, with the electronic processor, a schedule associated with each of the plurality of participants associated with the calendar event. The method also includes aggregating, with the electronic processor, the schedules of each of the plurality of participants assigned to each of the plurality of categories to create an aggregated schedule associated with each of the plurality of categories, the aggregated schedule for each of the plurality of categories including a sub-region for each of the plurality of participants assigned to the category representing a schedule over a period of time, and generating and outputting a user interface for display on a display device, the user interface including the aggregated schedule of each of the plurality of categories in separate regions of the user interface.

A further embodiment provides non-transitory, computer-readable medium including instructions executable by an electronic processor to perform a set of functions. The set of functions including retrieving a category assigned from a plurality of categories to each of a plurality of participants associated with a calendar event, the plurality of categories including a required category and an optional category and retrieving a schedule associated with each of the plurality of participants associated with the calendar event. The set of functions also including aggregating the schedules of each of the plurality of participants assigned to each of the plurality of categories to create an aggregated schedule associated with each of the plurality of categories, and generating and outputting a user interface for display on a display device, the user interface including the aggregated schedule of each of the plurality of categories in separate regions of the user interface.

DETAILED DESCRIPTION

Figure 1:
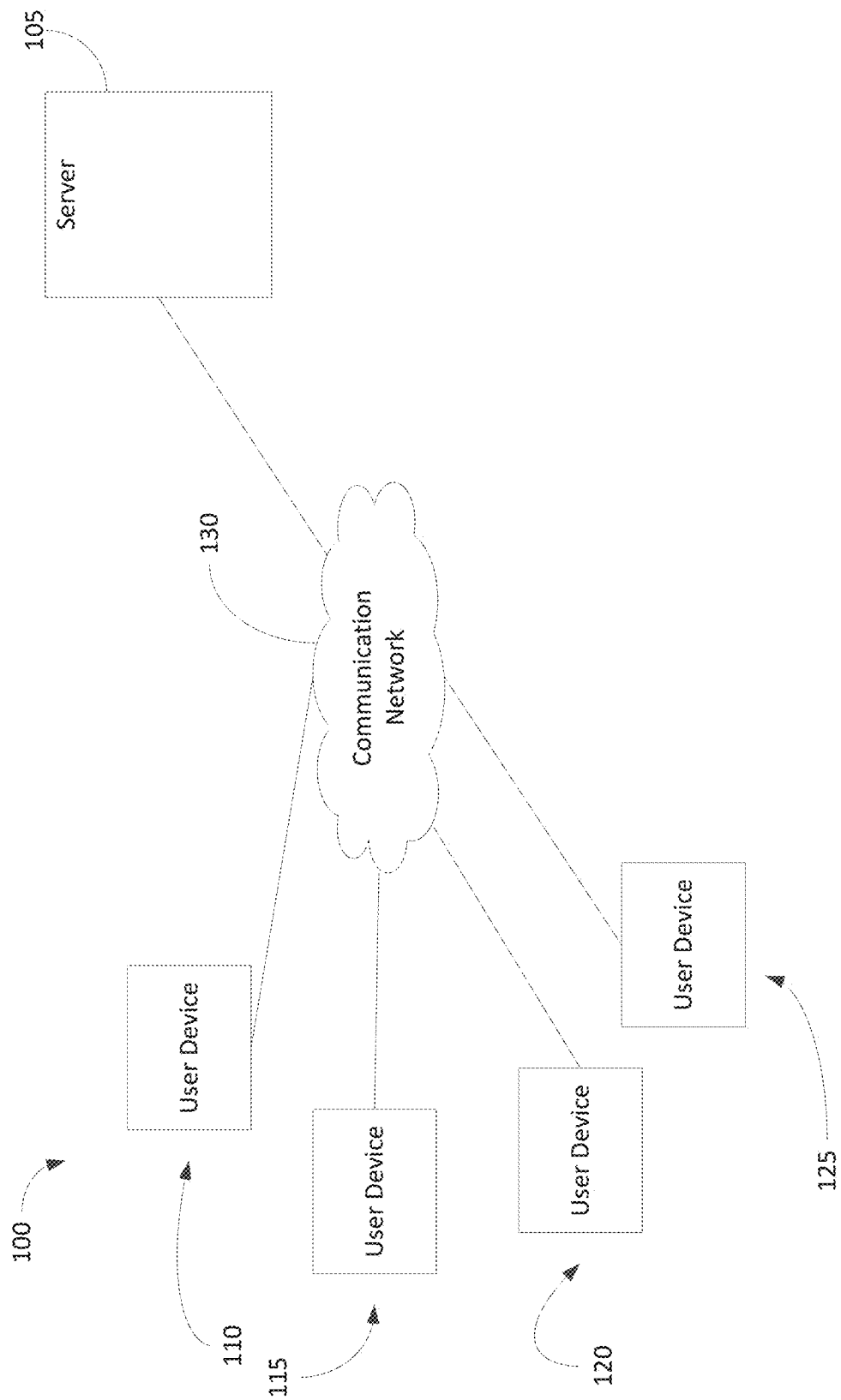
FIG. 1 schematically illustrates a system for providing electronic scheduling assistance according to some embodiments.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

As described above, in situations where the attendance of some participants in a calendar event, such as a meeting, is optional, displaying the aggregated schedule for each participant of the event makes it difficult for the organizer to determine if there is a time where each participant who is required to attend the event is available even if other participants who are not required to attend are unavailable. Therefore, embodiments described herein provide an electronic scheduling assistant that allows participants to be assigned a category (for example, a required category or an optional category) and uses such category assignments to generate a separate aggregated schedule for each category. The separate aggregated schedules allow an organizer to easily and efficiently determine when, for example, all participants associated with a required category are available for a meeting. Furthermore, by collapsing the aggregated schedule for a particular category, the user interfaces described herein provide a more efficient user interface that allows an organizer to quickly navigate to and select a time for an event.

FIG. 1 schematically illustrates an example system 100 for providing electronic scheduling assistance. The system 100 illustrated in FIG. 1 includes a server 105 and one or more user devices 110, 115, 120, 125. The server 105 and the user devices 110, 115, 120, 125 communicate over one or more wired or wireless communication networks 130. Portions of the wireless communication networks 130 may be implemented using a wide area network, such as the Internet, a local area network, such as a Bluetooth™ network or Wi-Fi, and combinations or derivatives thereof. It should be understood that the server 105 may communicate with any number of user devices, and the four user devices 110, 115, 120, 125 illustrated in FIG. 1 are purely for illustrative purposes. Similarly, it should also be understood that the system 100 may include any number of servers and the single server 105 illustrated in FIG. 1 is purely for illustrative purposes. Also, in some embodiments, one of the user devices 110, 115, 120, 125 may communicate with the server 105 through one or more intermediary devices (not shown).

Figure 2:
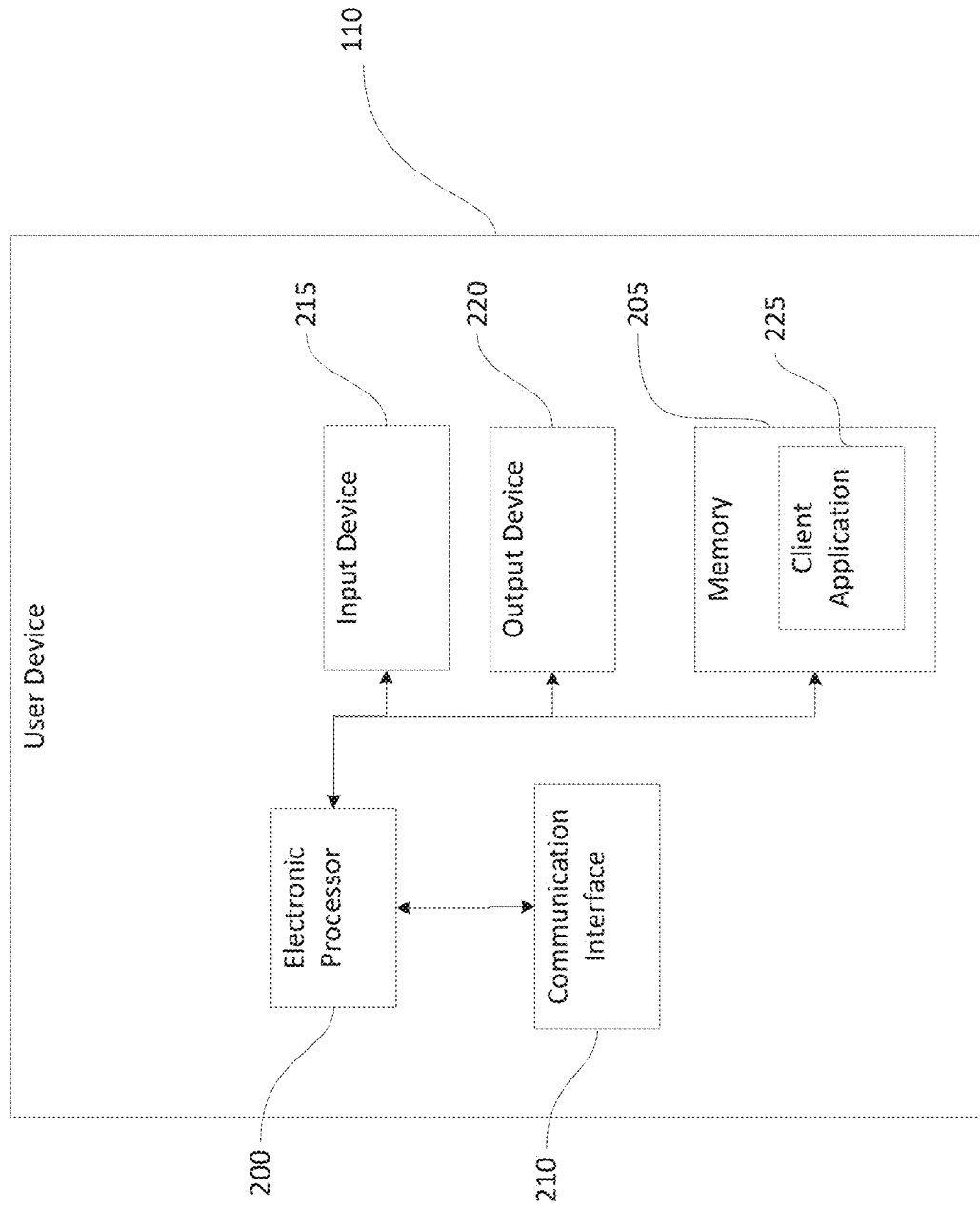
FIG. 2 schematically illustrates a user device included in the system of FIG. 1 according to some embodiments.

FIG. 2 schematically illustrates the user device 110 according to some embodiments. The user device 110 is an electronic computing device, such as a desktop computer or terminal, a laptop, a tablet computer, a smart phone, a smart television, a smart whiteboard, a smart wearable, or the like. As illustrated in FIG. 2, the user device includes an electronic processor 200 (for example, a microprocessor, application-specific integrated circuit (ASIC), or another suitable electronic device), a memory 205 (a non-transitory, computer-readable storage medium), and a communication interface 210, such as a transceiver, for communicating over the communication network(s) 130 and, optionally, one or more additional communication networks or connections. The communication interface 210 allows the user device 110 to communicate with the server 105 over the communication network(s) 130.

The user device 110 also includes an input device 215 and a display device 220. The display device 220 may include, for example, a touchscreen, a liquid crystal display ("LCD"), a light-emitting diode ("LED"), a LED display, an organic LED ("OLED") display, an electroluminescent display ("ELD"), and the like. The input device 215 may include, for example, a keypad, a mouse, a touchscreen (for example, as part of the display device 220), a microphone, a camera, or the like (not shown). The electronic processor 200, the memory 205, the communication interface 210, the input device 215, and the display device 220 communicate wirelessly, over one or more communication lines or buses, or a combination thereof.

The electronic processor 200 is configured to execute instructions (for example, stored in the memory 205) to perform various functionality. For example, in the embodiment illustrated in FIG. 2, the memory 205 includes a client application 225 that allows the user device 110 to communicate with the server 105 and, in particular, access the electronic scheduling assistance provided via the server 105 as described herein. For example, in some embodiments, the client application 225 includes a browser application, such as Internet Explorer® provided by Microsoft Corporation, configured to access the electronic scheduling assistance described herein. In other embodiments, the client application includes an electronic calendaring application, such as Outlook® provided by Microsoft Corporation, configured to access the electronic scheduling assistance described herein.

It should be understood that the user device 110 may include additional components than those illustrated in FIG. 2 in various configurations and may perform additional functionality than the functionality described herein. For example, in some embodiments, the user device 110 includes multiple electronic processors, multiple memories, multiple communication interfaces, multiple input devices, multiple output devices, or a combination thereof. Also, it should be understood that, although not described or illustrated herein, the user devices 115, 120, 125 may include similar components and perform similar functionality as the user device 110. Additionally, while embodiments below are described with regards to the user device 110, the embodiments described below may similarly be performed by any user device included in the system 100.

Figure 3:
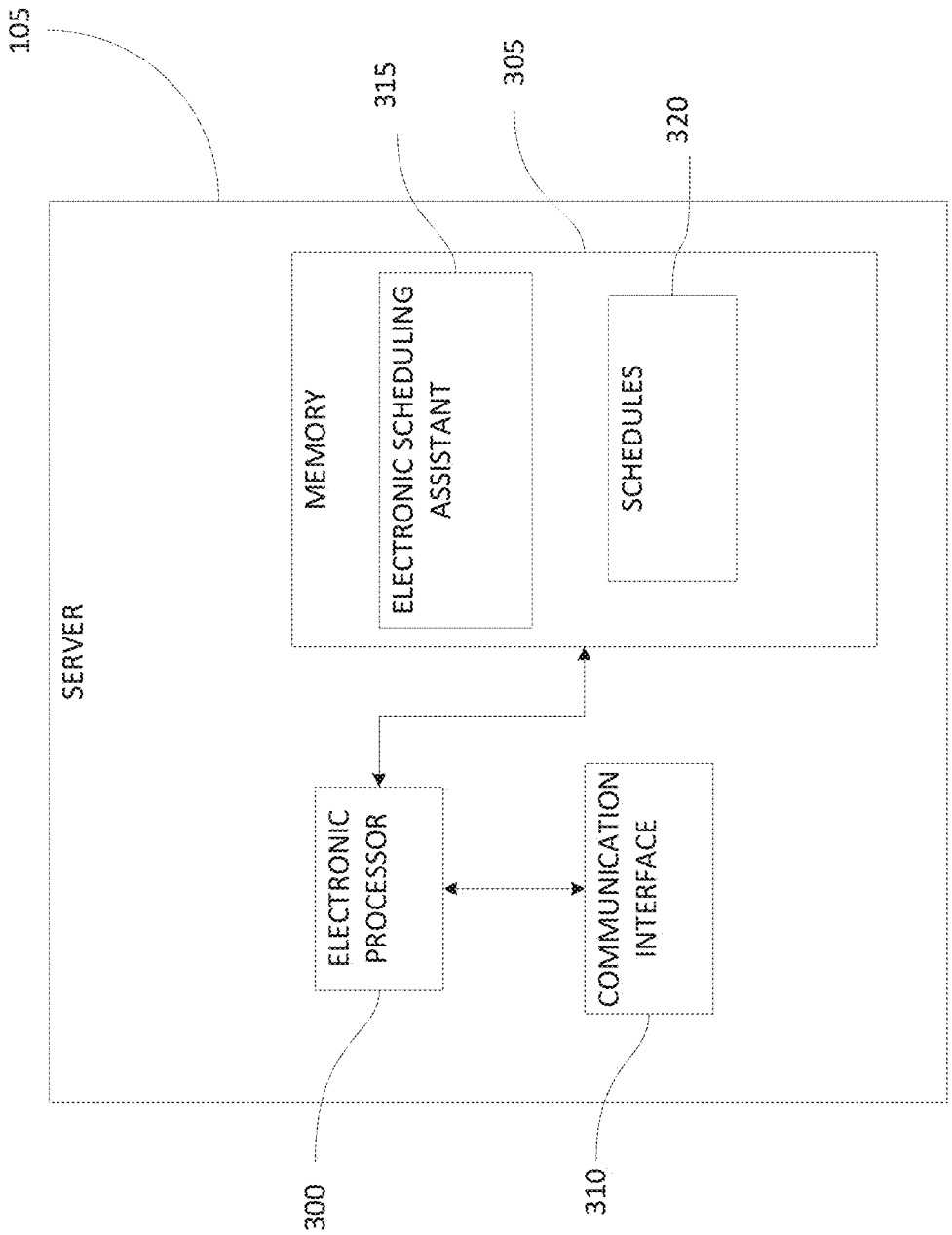
FIG. 3 schematically illustrates a server included in the system of FIG. 1 according to some embodiments.

FIG. 3 schematically illustrates the server 105 according to some embodiments. As illustrated in FIG. 3, the server 105 is an electronic computing device that includes an electronic processor 300 (for example, a microprocessor, application-specific integrated circuit (ASIC), or another suitable electronic device), a memory 305 (a non-transitory, computer-readable storage medium), and a communication interface 310, such as a transceiver, for communicating over the communication network(s) 130 and, optionally, one or more additional communication networks or connections. The electronic processor 300, the memory 305, and the communication interface 310 communicate wirelessly, over one or more communication lines or buses, or a combination thereof. It should be understood that the server 105 may include additional components than those illustrated in FIG. 3 in various configurations and may perform additional functionality than the functionality described herein. Furthermore, the functionality described herein as being performed by the server 105 may be performed in a distributed nature, such as via a plurality of servers or similar devices included in a cloud computing environment.

The electronic processor 300 is configured to execute instructions (for example, stored in the memory 305) to perform various functionality. For example, in the embodiment illustrated in FIG. 3, the memory 305 includes an electronic scheduling assistant 315 that is configured to, when executed by the electronic processor 300, perform the functionality described herein. For example, as described in more detail below, the electronic scheduling assistant 315 generates and outputs user interfaces that include an aggregated schedule for participants of a calendar event assigned to a particular category. As used in the present application, a "calendar event" may include a meeting, a conference call, a conference or presentation, a task, or any other type of event that is associated with a time (for example, a date and a time and potentially a duration) and multiple participants. Also, as used in the present application, a "participant" of a calendar event may include an individual, a group of individuals (such as a department at an organization), a location, such as a conference room, or another resource associated with event, such as, for example, audio/visual equipment, catering services, or the like. In some embodiments, the electronic scheduling assistant 315 is a stand-alone software application and, in other embodiments, the electronic scheduling assistant is integrated in a larger software application, such as an electronic calendaring application (for example, Outlook® provided by Microsoft Corporation).

As illustrated in FIG. 3, in some embodiments, the memory 305 also stores one or more schedules 320, wherein each schedule 320 is associated with a participant. It should be understood that, in some embodiments, the schedules 320 are stored in a separate memory from the electronic scheduling assistant 315 or, in some embodiments, in a separate computing device from the server 105.

Each schedule 320 represents one or more events associated with a participant, including, for example, the dates, times, and durations of each event. The schedules 320 may also include other information for an event, such as a location, a title or description, or the like. It should be understood that the schedules 320 may be organized in various ways. For example, in some embodiments, each participant may be associated with a set of events (resulting in the storage of a separate set of events for each participant). However, alternatively or in addition, a set of events may be stored, wherein each event is associated with one or more participants (resulting in the storage of a single set of events).

Based on the information stored in the schedules 320, the electronic scheduling assistant 315 generates user interfaces displaying a schedule for one or more participants. For example, in some embodiments, a displayed schedule includes a plurality of time slots, such as a plurality of minutes, hours, days, or the like, and each of the displayed time slots (or portions of displayed time slots) can be marked as either an available time slot or an unavailable time slot. In general, a time slot may be marked as an available time slot when no event is currently (or tentatively) scheduled for a participant during the time slot (during any part of the time slot or for the entire time slot) or, if such an event is schedule, the event is marked as not effecting the user's availability for other events. Similarly, a time slot may be marked as unavailable time slot when an event is currently (or tentatively) scheduled for a participant during the time slot (during any part of the timeslot or for the entire time slot). Available time slots and unavailable time slots can be marked or distinguished in the user interfaces in various ways, including using different font, colors, fill patterns, or the like. Also, it should be understood that other classifications of time slots can be used, such as by allowing more than just two classifications (available or unavailable). For example, in some embodiments, time slots may be marked as available, unavailable, tentatively available, out-of-the-office, do-not-disturb, or the like.

The schedules 320 are updated as calendar event are created, accepted, declined, or the like. For example, when a new calendar event is created by an organizer and sent to a participant, the schedule 320 of the organizer can be updated to mark the time associated with the new calendar event as being unavailable and the schedule 320 of the participant can be updated to mark the time associated with the new calendar event as being unavailable. In some embodiments, the time associated with the new calendar event within the participant's schedule can be initially marked as being tentatively unavailable and can be subsequently marked as being unavailable or available depending on whether the participant accepts or declines the event. In some embodiments, the electronic scheduling assistant 315 is configured to update and manage schedules 320. However, alternatively or in addition, a separate application or service may be configured to update the manage the schedules 320 while the electronic scheduling assistant 315 accesses the schedules to generate the user interfaces and associated functionality described herein.

Figure 4:
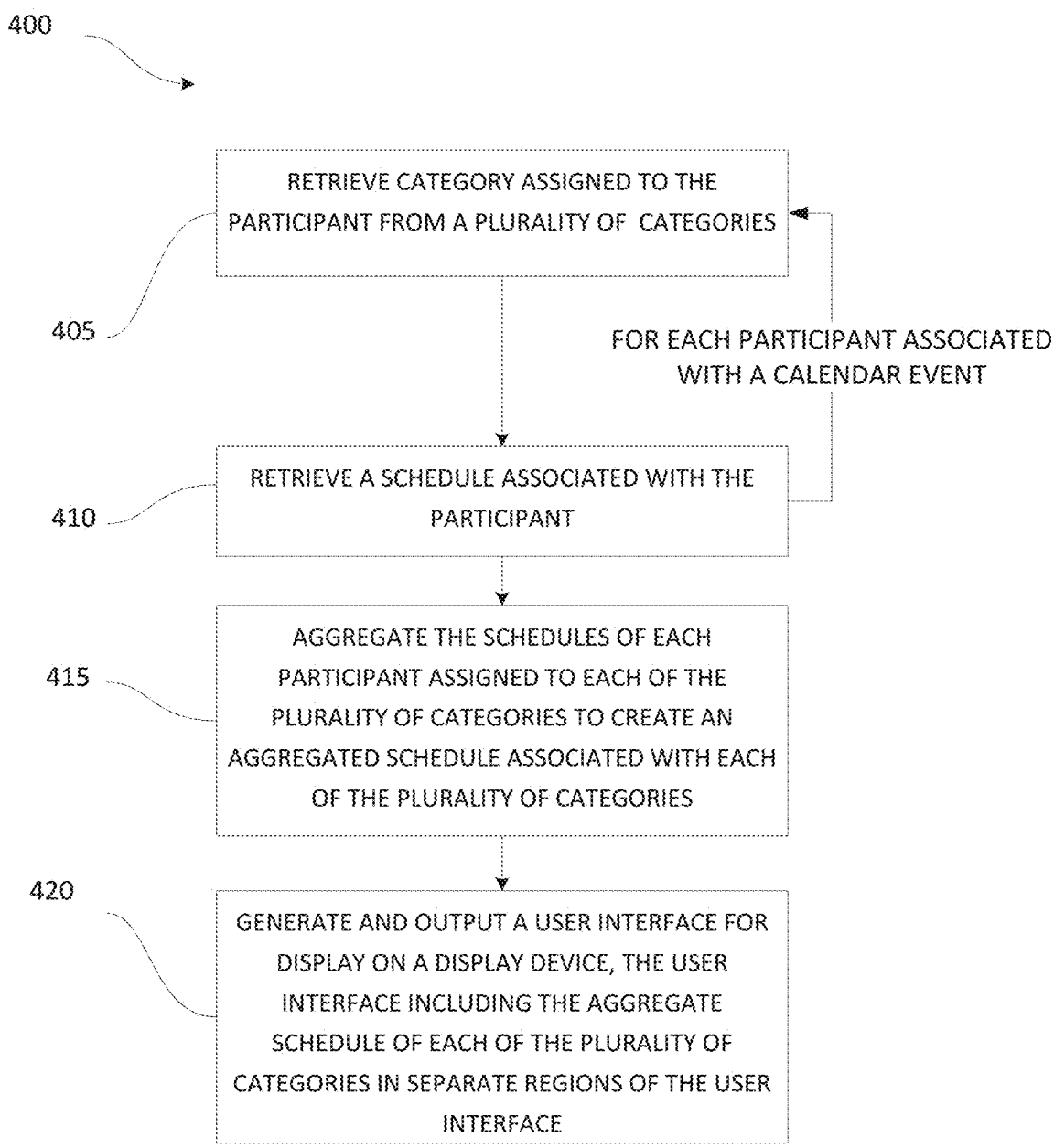
FIG. 4 is a flowchart illustrating a method performed by the system of FIG. 1 for providing electronic scheduling assistance according to some embodiments.

FIG. 4 illustrates an example method 400 of providing electronic scheduling assistance. The method 400 is described as being performed by the electronic scheduling assistant 315 (as executed by the electronic processor 300). However, it should be understood that method 400 or portions thereof may be performed by other applications or devices. For example, in some embodiments, the method 400 or portions thereof are performed by the client application 225, as executed by the electronic processor 200 included in the user device 110, which is configured to communicate with the server 105. The method 400 is also described as being performed as part of scheduling a new calendar event by an organizer, wherein the organizer has specified a plurality of participants for the calendar event and, optionally, a time or time range for the calendar event.

However, it should be understood that the method 400 is also applicable during updating of an existing, already-scheduled calendar event.

As illustrated in FIG. 4, the method 400 includes, for each of the plurality of participants associated with the calendar event, retrieving a category assigned to the participant from a plurality of available categories (at block 405) and retrieving a schedule associated with the participant (at block 410). In some embodiments, the plurality of available categories includes a required category and an optional category. However, it should be understood that other categories may be used and, in some embodiments, more than two categories may be used. For example, the categories may include a required category, an optional category, and a location category, which designates participants that represent locations or other resources, such as conference rooms, equipment, services, or the like. Similarly, other categories may be used, such as speaker or presenter category, which may indicate that a participant is required to speak or present at the calendar event (as compared to merely attending the event).

In some embodiments, the organizer selects the category for one or more of the participants of the new calendar event as part of specifying the participants for the new calendar event. For example, as part of creating the calendar event, an organizer may select (via the input device 215 of the user device 110) a category for one or more participants for the event. The selection may be performed via a drop-down selection menu or other mechanisms, such as by dragging and dropping a representation of a participant (for example, an icon) into an areas of a user interface associated with a particular category. Also, as described below with respect to FIG. 5, an organizer can select a category for a participant by adding a participant to different sections of a displayed user interface.

Alternatively or in addition, a category may be automatically selected for a participant. For example, the required category may be automatically selected for the organizer of the event. Similarly, user roles (for example, whether a participant is a manger of a project), locations, or historical selections may be used to automatically select a category for a participant. Automatically-selected categories may be presented to the organizer for confirmation and updating as needed. For example, in some embodiments, a user can update selected categories within the user interfaces described herein (whether initially selected by the organizer or automatically).

In some embodiments, the schedule 320 retrieved for a particular participant (at block 410) may include the participant's entire schedule (all events occurring presenting and in the future). Alternatively, the schedule 320 retrieved for a particular participant of the new calendar event may include timeslots and any associated events representing a particular duration of time. For example, when the organizer specifies a time for the new calendar event, a predetermined time period before the specified time, after the specified time, or both may be retrieved from the schedules 320. Alternatively, the duration of time may be specified by the organizer as part of the creating the new calendar event. Furthermore, in some embodiments, the duration of time may vary based on the details of the new event (for example, a duration, a location, a number of participants, or the like) or may include a static duration, such as the next day, week, or month.

As illustrated in FIG. 4, the method 400 also includes aggregating the schedules of each participant assigned to each of the plurality of categories to create an aggregated schedule associated with each of the plurality of categories (at block 415) and generating and outputting a user interface for display on a display device, the user interface including the aggregate schedule of each of the plurality of categories in separate regions of the user interface (at block 420).

Figure 5:
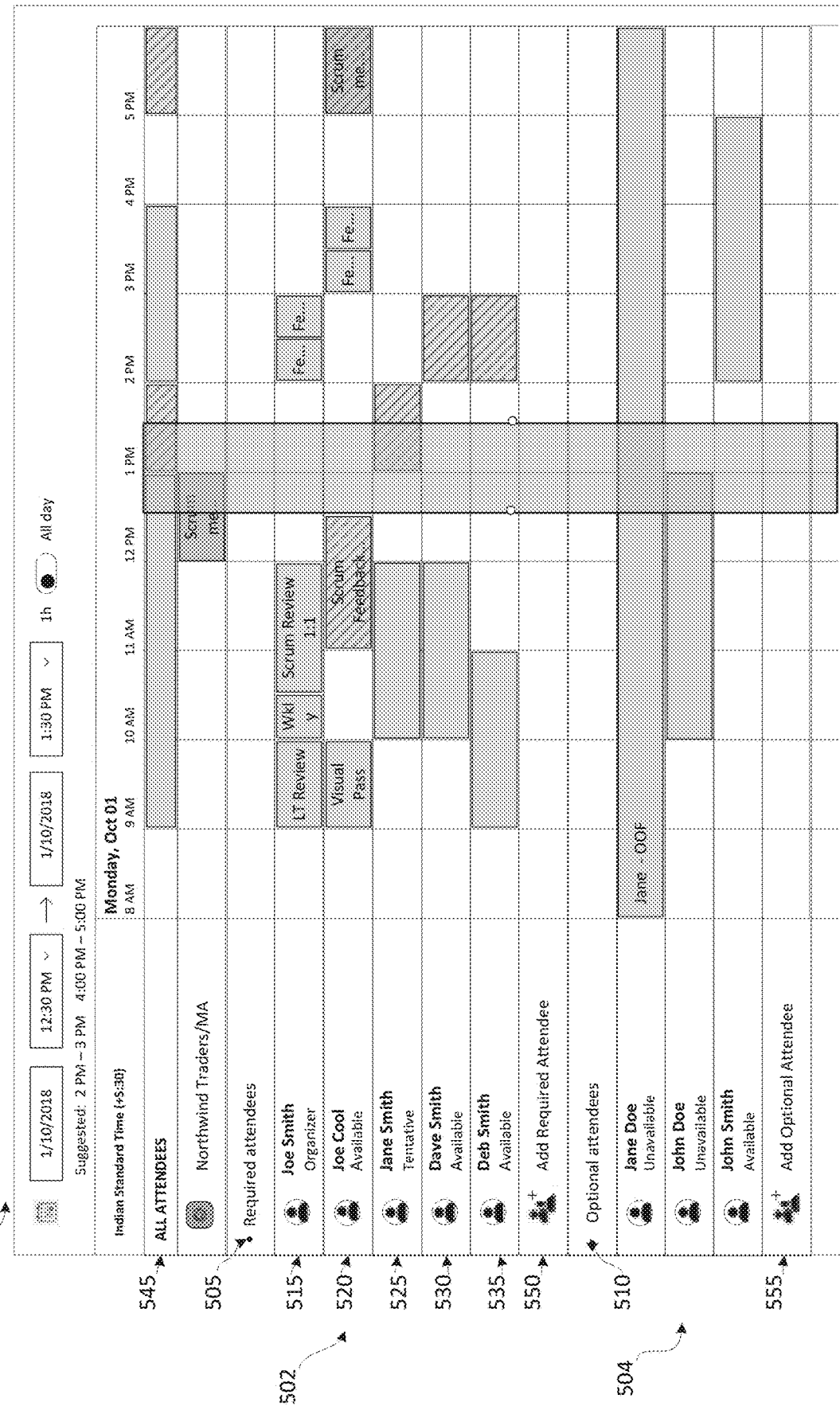
FIGS. 5-6 illustrate a user interface of an electronic scheduling assistant according to some embodiments.

For example, FIG. 5 illustrates a user interface 500 including an aggregated schedule for each of a plurality of categories according to some embodiments. In particular, as illustrated in FIG. 5, the user interface 500 includes an aggregated schedule 502 for the required category and an aggregated schedule 504 for an optional category. Each aggregated schedule 502, 504 is displayed in a separate region of the user interface 500. For example, as illustrated in FIG. 5, in some embodiments, the aggregated schedules 502, 504 are displayed in a horizontally-stacked orientation wherein the time slots included in each aggregated schedule are aligned such that time slots representing the same time in each aggregated schedule are aligned horizontally. It should be understood that FIG. 5 illustrates one example orientation of the aggregated schedules and other orientations and configurations are possible, including, for example, a vertically-stacked orientation.

As illustrated in FIG. 5, each aggregated schedule 502, 504 includes a sub-region for each participant assigned to the category, wherein the sub-region represents a schedule of the participant over a period of time. In particular, the aggregated schedule 502 includes a sub-region 515 displaying a schedule for John Smith, a sub-region 520 displaying a schedule for Joe Cool, a sub-region 525 displaying a schedule for Jane Smith, a sub-region 530 displaying a schedule for Dave Smith, and a sub-region 535 displaying a schedule for Jane Smith, all of whom have been set as required participants.

As illustrated in FIG. 5, in some embodiments, a participant may be added to the plurality of participants associated with a category using the user interface 500. For example, the user interface 500 includes a selectable add required attendee option 550, which a user can select to enter an identifier of a participant, such as a name from a drop-down menu populated with the organizer's contacts, a directory of users associated with an entity, or the like. When adding a participant using the add required attendee option 550, the added participant is automatically set as a required participant (without requiring a separate selection by the user). Similarly, the user interface 500 also includes a selectable add optional attendee option 555, which a user can select to add additional potential participants to the new calendar event. Accordingly, in some embodiments, after entering a potential date and time for a new calendar event, the organizer can use the user interface 500 to add and categorize participants for the new calendar event. As participants are added using these options 550, 555, the aggregated schedules 502, 504 can be updated to add a sub-region for the added participant. In some embodiments, the organizer can also drag and drop one or more participants (particular sub-regions) from one category or another within the user interface 500. Similarly, in some embodiments, the organizer can drag and drop an entire category of participants to another category, such as by dragging multiple sub-regions within an aggregated schedule for a category or a single, combined sub-region for a category as described below with respect to FIG. 6.

In some embodiments, the electronic scheduling assistant 315 is also configured to individually collapse an aggregated schedule of a category into a single sub-region representing the combined schedule for all participants assigned to a category one of the plurality of categories. For example, as illustrated in FIG. 5, the user interface 500 includes a user-selectable collapse option 505 associated with the aggregated schedule 502 (required category) and a user-selectable collapse option 510 associated with the aggregated schedule 504 (optional category). When the user-selectable collapse option 505 is selected, the electronic scheduling assistant 315 replaces the aggregated schedule 502 with a single sub-region that represents a combined schedule of all the required participants. In particular, instead of displaying the separate sub-regions 515, 520, 525, 530, and 535 as illustrated in FIG. 5, the electronic scheduling assistant 315 displays a single sub-region 605 as illustrated in the user interface 600 of FIG. 6. Although not described herein, selecting the user-selectable collapse option 510 similarly replaces the aggregated schedule 504 with a single sub-region for the optional category as described herein for the required category.

For example, as illustrated in FIG. 5, the sub-regions 515, 520, 525, 530, 535 indicate that the required participants Joe Smith, Joe Cool, Jane Smith, Dave Smith, and Deb Smith are all available only from 12:30 PM to 1 PM. Therefore, the single sub-region 605 illustrated in FIG. 6 for the required category indicates that the participants associated with required category are available from 12:30 PM to 1 PM (the time slots associated with this duration are marked as being available). Similarly, since at least one of the required participants are unavailable (including tentatively unavailable) during the other time slots, the remaining, other time slots included in the sub-region 605 are marked as being unavailable. Accordingly, the collapsed single sub-region 605 represents a plurality of time slots similar to the aggregated schedule 502 but each of the plurality of time slots included in the sub-region 605 is marked as an available time slot or an unavailable time slot based on whether all of the required participants are collectively available or unavailable. In other words, a time slot included in the sub-region 605 is marked as an available time slot in response the schedule retrieved for each participant assigned to the required category having the time slot marked as an available time slot and, alternatively, is marked as an available time slot in response the schedule retrieved for at least one participant assigned to the required category having the one of the plurality of time slots marked as an unavailable time slot. It should be understood that other ways of combining the schedules for the single sub-region 605 may be used, such as by considering whether a majority of participants are available or unavailable or marking timeslots as tentatively unavailable if any participant has the time slot marked as tentatively unavailable.

Figure 6:
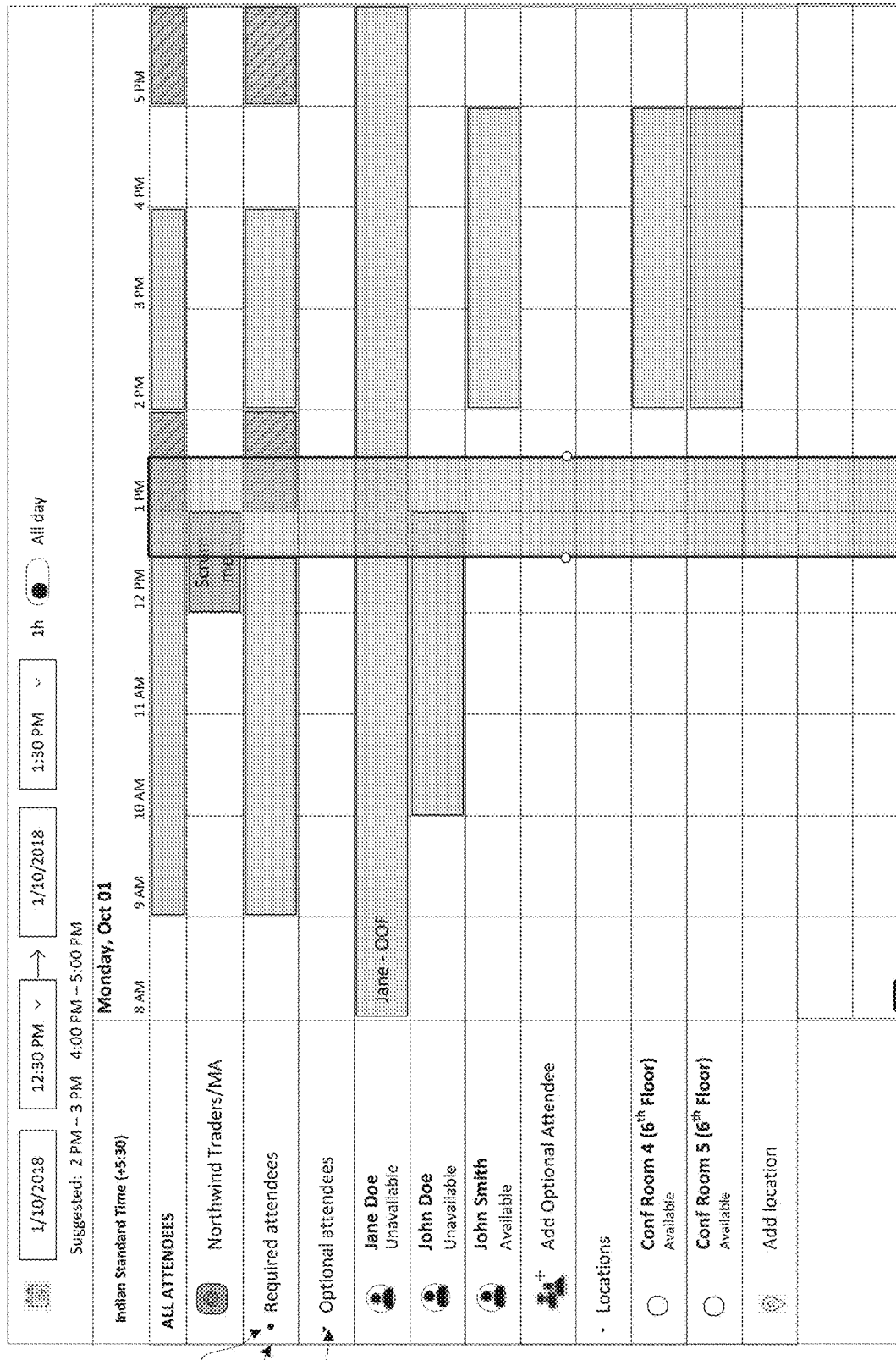

The electronic scheduling assistant 315 may also be configured to individually expand a single sub-region representing the combined schedule for all participants assigned to one category back into the aggregated schedule for the category. For example, in some embodiments, as illustrated in FIG. 6, when a single sub-region for a category is displayed, the user-selectable collapse option may convert to a user-selectable expand option. However, in other embodiments, separate options (selection mechanisms) may be used.

As illustrated in FIG. 6, in some embodiments, only a maximum number of single participants from a category may be allowed for a calendar event. For example, a location category may include a set of potential locations for the event and aggregated and combined (collapsed) schedules can be provided for this category of participants. However, to schedule the event, only one of the locations may be selected and the user may make this selection through the user interface 600 using, for example, the displayed radio buttons. In other embodiments, however, the organizer may select a single location on a separate user interface, such as a pop-up window when the new calendar event is saved or approved. Alternatively or in addition, when only one of the locations in the location category is available for the specified time for the event, that location may be automatically selected for the event (without requiring selection by the organizer). Also, in some embodiments, a location may be automatically selected based on various factors, such as, for example, size, proximity to one or more participants, duration of the event, historical usage of the location, or the like. Also, in some embodiments, radio buttons provided for participants within a particular category may be used to include and exclude a participant from a category (without having to completely remove and subsequently re-add a participant). Accordingly, an organizer can use such buttons to see aggregate or combined schedules based on different subsets of various categories to identify an optimal time for an event.

As also illustrated in FIGS. 5 and 6, in some embodiments, one or more participants associated with an event may not be associated with a category. For example, in the example user interface 500 and the example user interface 600, the participant Northwind Traders is not associated with a category. These participants may be displayed as part of a default "un-assigned" category and can be associated with an aggregated schedule and collapsed single sub-region (combined schedule) as described above for other categories.

As also illustrated in FIGS. 5 and 6, in some embodiments, a user can selectively enable and disable the separation of participants by category by selecting an all attendees option 545. In particular, when this option 545 is selected, the separate aggregated schedules for each category are removed and separate sub-regions for each participant may be provided as described herein without grouping or other categorizing participants.

It should be understood that although the electronic scheduling assistant 315 is described herein as being executed and provided via the server 105 (as part of a hosted service or application), in some embodiments, the functionality described herein with respect to the assistant 315 (or a portion thereof) may be performed via the client application 225 executed via the electronic processor 200 of the user device 110. For example, in some embodiments, the client application 225 may be configured generate and output the user interfaces described herein but may communicate with the server 105 (or other servers or devices) to access the schedules 320 used to generate the user interfaces. Also, in some embodiments, the schedules 320 or a portion thereof may be stored locally at the user device 110, which may allow the user device 110 to generate and output the user interfaces described herein and the associated functionality without the need to access an external device, such as the server 105.

Various features and advantages of some embodiments are set forth in the following claims.

What is claimed is:

1. A system for providing electronic scheduling assistance within an electronic calendar application, the system comprising:
    an electronic computing device including an electronic processor, the electronic processor configured to:
        for each participant of a plurality of participants associated with a calendar event:

retrieve data indicating, from a plurality of categories including a required category and an optional category, a category assigned to the participant for the calendar event, and retrieve a schedule of the participant;

generate, for the required category, a first aggregated schedule, the first aggregated schedule based on the schedule of each participant included in a first subset of the plurality of participants, each participant included in the first subset of the plurality of participants assigned to the required category;

generate, for the optional category, a second aggregated schedule, the second aggregated schedule based on the schedule of each participant included in a second subset of the plurality of participants, each participant included in the second subset of the plurality of participants assigned to the optional category;

generate and output, within the electronic calendar application, a user interface, the user interface including a first region and a second region, the first region associated with the required category and including:

the first aggregated schedule, and a graphical user interface control element, the second region associated with the optional category and including:

the second aggregated schedule; and in response to receiving a selection of the graphical user interface control element included in the first region of the user interface associated with the required category:

prompt a user for an identifier of a new participant associated with the calendar event;

retrieve a schedule associated with the new participant;

automatically, based on the inclusion of the graphical user interface control element in the first region associated with the required category, assign the new participant to the required category for the calendar event; and update the first aggregated schedule within the first region of the user interface based on the schedule associated with the new participant, wherein the first aggregated schedule and the second aggregated schedule included in the user interface each include a plurality of sub-regions, wherein each of the plurality of sub-regions included in the first aggregated schedule represent the schedule of one of the participants included in the first subset of the plurality of participants and each of the plurality of sub-regions included in the second aggregated schedule represent the schedule of one of the participants included in the second subset of the plurality of participants, and wherein the electronic processor is further configured to:

collapse the plurality of sub-regions included in the first aggregated schedule into a single sub-region representing a combined schedule for all participants included in the first subset of the plurality of participants.

2. The system according to claim 1, wherein the electronic processor is configured to collapse the plurality of sub-regions included in the first aggregated schedule in response to user input.

3. The system according to claim 1, wherein the combined schedule represents a plurality of time slots and wherein each of the plurality of time slots is marked as an available time slot or an unavailable time slot.

4. The system according to claim 3, wherein one of the plurality of time slots is marked as an available time slot in response to the schedule retrieved for each participant included in the first subset of the plurality of participants having the one of the plurality of time slots marked as an available time slot.

5. The system according to claim 3, wherein one of the plurality of time slots is marked as an available time slot in response to the schedule retrieved for at least one of the participants included in the first subset of the plurality of participants having the one of the plurality of time slots marked as an unavailable time slot.

6. The system according to claim 1, wherein the electronic processor is further configured to expand the single sub-region into the plurality of sub-regions in response to user input.

7. A method for providing electronic scheduling assistance within an electronic calendar application, the method comprising:

for each participant of a plurality of participants associated with a calendar event:

retrieving, with an electronic processor, data indicating, from a plurality of category including a required category and an optional category, a category assigned to the participant for the calendar event, and retrieving, with the electronic processor, a schedule of the participant;

generating, with the electronic processor, a plurality of sub-regions, each of the plurality of sub-regions including:

an identifier of one of the plurality of participants, and a plurality of time slots representing availability of the one of the plurality of participants over a common period of time based on the schedule retrieved for the one of the plurality of participants;

generating and outputting, within the electronic calendar application, a user interface, the user interface including:

the plurality of sub-regions in a stacked orientation to form a grid, and a graphical user interface control element, wherein a first subset of the plurality of sub-regions associated with a first subset of the plurality of participants are presented as a first continuous group within the grid and a second subset of the plurality of sub-regions associated with a second subset of the plurality of participants are presented as a second continuous group within the grid, wherein each participant included in the first subset of the plurality of participants is assigned to the required category, wherein each participant included in the second subset of the plurality of participants is assigned to the optional category, and wherein the graphical user interface control element is associated with the first continuous group within the user interface; and in response to receiving a selection of the graphical user interface control element included in the user interface:

prompting a user for an identifier of a new participant associated with the calendar event;

retrieving a schedule associated with the new participant;

automatically, based on the association of the graphical user interface control element with the first continuous group within the user interface, assigning the new participant to the required category for the calendar event; and
updating the first continuous group within the grid to include a sub-region associated with the new participant.

8. The method according to claim 7, further comprising in response to receiving user input, collapsing the first subset of the plurality of sub-regions into a single sub-region representing a combined schedule for all participants included in the first subset of the plurality of participants, the single sub-region including a plurality of combined time slots over the common period of time and wherein each of the plurality of combined time slots included in the single sub-region is marked as an available time slot or an unavailable time slot.

9. The method according to claim 8, further comprising marking one of the plurality of combined time slots included in the single sub-region as an available time slot in response the schedule retrieved for each of the plurality of participants included in the first subset of the plurality of participants having a time associated with the one of the plurality of combined time slots marked as available.

10. The method according to claim 8, further comprising marking one of the plurality of combined time slots included in the single sub-region as an unavailable time slot in response the schedule retrieved for at least one of the plurality of participants included in the first subset of the plurality of participants having a time associated with the one of the plurality of combined time slots marked unavailable.

11. A non-transitory, computer-readable medium storing instructions that, when executed by an electronic processor, perform a set of functions, the set of functions comprising:
retrieving a schedule associated with a first participant associated with a calendar event, the first participant assigned to a required category for the calendar event;
retrieving a schedule associated with a second participant associated with the calendar event, the second participant assigned to an optional category for the calendar event;
generating a first sub-region, the first sub-region including:
an identifier of the first participant, and
a plurality of time slots representing availability of the first participant over a common period of time based on the schedule retrieved for the first participant;
generating a second sub-region, the second sub-region including:
an identifier of the first participant, and
a plurality of time slots representing availability of the second participant over the common period of time based on the schedule retrieved for the second participant;
generating and outputting, within an electronic calendar application, a user interface, the user interface including:
a first region associated with the required category, the first region including:
the first sub-region, and
a graphical user interface control element, and
a second region associated with the optional category, the second region including:
the second sub-region; and
in response to receiving a selection of the graphical user interface control element included in the first region:
prompting a user for an identifier of a third participant associated with the calendar event;
retrieving a schedule associated with the third participant;
automatically, based on the inclusion of the graphical user interface control element in the first region associated with the required category, assigning the third participant to the required category for the calendar event; and
updating the first region within the user interface to include a third sub-region associated with the third participant.

12. The non-transitory, computer-readable medium according to claim 11, the set of functions further comprising collapsing, in response to receiving user input, the first sub-region and the third sub-region into a single sub-region included in the first region, the single sub-region representing a combined schedule for the required category of the calendar event.

13. The non-transitory, computer-readable medium according to claim 12, wherein the single sub-region includes a plurality of combined time slots over the common period of time and wherein each of the plurality of combined time slots included in the single sub-region is marked as an available time slot or an unavailable time slot.

14. The non-transitory, computer-readable medium according to claim 13, wherein one of the plurality of combined time slots included in the single sub-region is marked as an available time slot in response the schedule retrieved for the first participant and the schedule retrieved for the third participant having a time associated with the one of the plurality of combined time slots marked as an available time slot.

15. The non-transitory, computer-readable medium according to claim 13, wherein one of the plurality of combined time slots included in the single sub-region is marked as an unavailable time slot in response the schedule retrieved for the first participant or the second schedule retrieved for the third participant having a time associated with the one of the plurality of combined time slots marked as unavailable.

16. The non-transitory, computer-readable medium according to claim 11, the set of functions further comprising automatically selecting the required category for the first participant based on at least one selected from a group consisting of a user role of the first participant, a location of the calendar event, and historical selections of categories for the first participant.

17. The non-transitory, computer-readable medium according to claim 11, the set of functions further comprising, in response to receiving a drag and drop of the first sub-region from the first region to the second region:
assigning the first participant to the optional category.

* * * * *